United States Patent
Shoji

(10) Patent No.: US 9,218,681 B2
(45) Date of Patent: Dec. 22, 2015

(54) IMAGE PROCESSING APPARATUS AND IMAGE PROCESSING METHOD

(71) Applicant: CANON KABUSHIKI KAISHA, Tokyo (JP)

(72) Inventor: Ryota Shoji, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 428 days.

(21) Appl. No.: 13/690,049

(22) Filed: Nov. 30, 2012

(65) Prior Publication Data

US 2013/0163813 A1   Jun. 27, 2013

(30) Foreign Application Priority Data

Dec. 26, 2011   (JP) .................. 2011-284457

(51) Int. Cl.
G06K 9/00 (2006.01)
G06K 9/40 (2006.01)
G06T 11/60 (2006.01)

(52) U.S. Cl.
CPC ....... G06T 11/60 (2013.01); *G06T 2207/20208* (2013.01)

(58) Field of Classification Search
CPC ............ G06T 2207/20208; G06T 2207/20172
See application file for complete search history.

(56) References Cited

U.S. PATENT DOCUMENTS

| | | | | |
|---|---|---|---|---|
| 5,828,793 A * | 10/1998 | Mann | | 382/284 |
| 7,953,251 B1 * | 5/2011 | Steinberg et al. | | 382/117 |
| 8,965,079 B1 * | 2/2015 | Zinaty et al. | | 382/128 |
| 8,971,625 B2 * | 3/2015 | Pitts et al. | | 382/167 |
| 2003/0052991 A1 * | 3/2003 | Stavely et al. | | 348/370 |
| 2009/0245688 A1 * | 10/2009 | Robinson et al. | | 382/284 |
| 2009/0274387 A1 * | 11/2009 | Jin | | 382/274 |
| 2010/0097476 A1 * | 4/2010 | Marks | | 348/169 |
| 2010/0103194 A1 * | 4/2010 | Chen et al. | | 345/629 |
| 2011/0188744 A1 * | 8/2011 | Sun | | 382/162 |
| 2012/0002899 A1 * | 1/2012 | Orr et al. | | 382/282 |
| 2012/0113130 A1 * | 5/2012 | Zhai et al. | | 345/589 |
| 2012/0249830 A1 * | 10/2012 | Tsubaki | | 348/229.1 |
| 2012/0250979 A1 * | 10/2012 | Yokoyama et al. | | 382/154 |
| 2013/0050426 A1 * | 2/2013 | Sarmast et al. | | 348/46 |
| 2013/0129146 A1 * | 5/2013 | Gabay | | 382/103 |
| 2014/0079333 A1 * | 3/2014 | Hirai et al. | | 382/255 |
| 2014/0085398 A1 * | 3/2014 | Tian et al. | | 348/14.01 |

FOREIGN PATENT DOCUMENTS

| | | |
|---|---|---|
| JP | 2002-251380 | 9/2002 |
| JP | 2008-046750 | 2/2008 |
| JP | 2009-065350 | 3/2009 |

* cited by examiner

*Primary Examiner* — Avinash Yentrapati
(74) *Attorney, Agent, or Firm* — Cowan, Liebowitz & Latman, P.C.

(57) ABSTRACT

An image processing apparatus for compositing a plurality of images that are shot with different exposures, comprises an object detection unit configured to detect object regions from the images; a main object determination unit configured to determine a main object region from among the object regions; a distance calculation unit configured to calculate object distance information regarding distances to the main object region for the object regions; and a compositing unit configured to composite the object regions of the plurality of images using a compositing method based on the object distance information, so as to generate a high dynamic range image.

11 Claims, 9 Drawing Sheets

| (0,0) | 8m |
|---|---|
| (0,1) | 7m |
| | |
| (M-1,N-1) | 2m |

F I G. 7
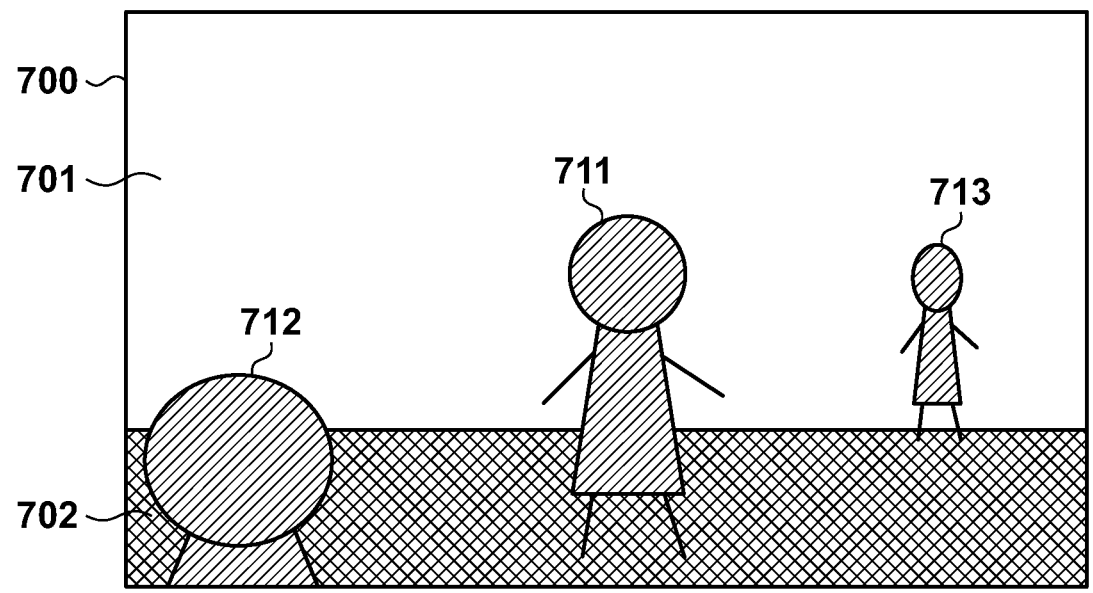

IMAGE PROCESSING APPARATUS AND IMAGE PROCESSING METHOD

BACKGROUND OF THE INVENTION

1. Field of the Invention

The present invention relates to a technique for compositing a plurality of images that are shot with different exposures, so as to generate an image with a wide dynamic range.

2. Description of the Related Art

In recent years, a high dynamic range (HDR) imaging (image compositing) function of shooting a plurality of images with different exposures and compositing these images so as to generate an image with a wide dynamic range is gathering attention as a technique for reducing a highlight-detail loss and a shadow-detail loss in dark areas due to a large difference in contrast. In general, because the dynamic ranges (contrast between the brightest and darkest areas) of CMOS image sensors or the like are narrower than the dynamic range in the realm of nature, a highlight-detail loss may occur in by far the brightest areas such as the area in sunlight, and a shadow-detail loss may occur in dark areas.

Reducing exposure during shooting in response to such a highlight-detail loss darkens the overall image and suppresses the occurrence of a highlight-detail loss, but instead a shadow-detail loss may occur in dark areas. On the other hand, increasing exposure in response to a shadow-detail loss brightens the overall image and suppresses the occurrence of a shadow-detail loss, but instead a highlight-detail loss may occur in bright areas.

HDR imaging can improve a highlight-detail loss and a shadow-detail loss in dark areas by shooting a plurality of images of the same composition with high and low exposures and compositing these images with weights assigned to low-exposed images in bright areas (e.g., highlight-detail loss) and weights assigned to high-exposed images in dark areas.

Here, consider the case of shooting a person with a background of a lighted-up fish tank in a place such as an aquarium where there is the fish tank in a substantially dark interior (backlight scene). In normal shooting, the fish tank has a highlight-detail loss because the person is shot with correct exposure, and if the fish tank is shot with correct exposure, the person will have a shadow-detail loss.

In this case, an image without a highlight-detail loss or a shadow-detail loss can be generated by using the HDR imaging function to composite an image that is shot with such an exposure that a person has no shadow-detail loss and an image that is shot with such an exposure that the fish tank has no highlight-detail loss. However, with the conventional HDR imaging function, in the case of shooting with such an exposure that a person has no shadow-detail loss, dark areas other than the person such as the wall and floor of the building are brightened, which ruins the special atmosphere of the aquarium.

In contrast, according to Japanese Patent Laid-Open No. 2009-065350, in the case of compositing an image that is shot so as to achieve correct exposure for the face region of a person and an image that is shot so as to achieve high exposure for the face region of the person, the ratio of compositing the image that has been shot with high exposure (hereinafter, "composite ratio") is increased in the face region of the person, and the composite ratio of the high-exposed image is reduced with increasing distance from the person, so as to brighten only the person.

However, the distance from the person according to the above-described Japanese Patent Laid-Open No. 2009-065350 is merely a distance in an image plane and is not a kind of factor that changes the composite ratio in consideration of the depth of a scene. For this reason, flexible image compositing, such as brightening a person who is present in the background at the back of a main object as part of the background, or keeping darken an irrelevant person who is present in front of the main object, is impossible.

SUMMARY OF THE INVENTION

The present invention has been made in consideration of the aforementioned problems, and realizes a technique that enables execution of HDR compositing while changing the composite ratio of images that are shot with different exposures in accordance with the distance from a main object, as well as maintaining the atmosphere of a shooting environment.

In order to solve the aforementioned problems, the present invention provides an image processing apparatus for compositing a plurality of images that are shot with different exposures, comprising: an object detection unit configured to detect object regions from the images; a main object determination unit configured to determine a main object region from among the object regions; a distance calculation unit configured to calculate object distance information regarding distances to the main object region for the object regions; and a compositing unit configured to composite the object regions of the plurality of images using a compositing method based on the object distance information, so as to generate a high dynamic range image.

In order to solve the aforementioned problems, the present invention provides an image processing method for use in an image processing apparatus for compositing a plurality of images that are shot with different exposures, the method comprising: an object detection step of detecting object regions from the images; a main object determination step of determining a main object region from among the object regions; a distance calculation step of calculating object distance information regarding distances to the main object region for the object regions; and a compositing step of compositing the object regions of the plurality of images using a compositing method based on the object distance information, so as to generate a high dynamic range image.

According to the present invention, it is possible to execute HDR imaging while changing the composite ratio of images that are shot with different exposures in accordance with the distance from a main object, as well as maintaining the atmosphere of a shooting environment.

Further features of the present invention will become apparent from the following description of exemplary embodiments with reference to the attached drawings.

BRIEF DESCRIPTION OF THE DRAWINGS

FIG. 7 illustrates an image that is shot so as to achieve correct exposure for a main object.

DESCRIPTION OF THE EMBODIMENTS

Embodiments of the present invention will be described in detail below. The following embodiments are merely examples for practicing the present invention. The embodiments should be properly modified or changed depending on various conditions and the structure of an apparatus to which the present invention is applied. The present invention should not be limited to the following embodiments. Also, parts of the embodiments to be described later may be properly combined.

The following is a description of an embodiment in which an image processing apparatus according to the present invention is applied to an image capturing apparatus that shoots an image, such as a digital camera.

Apparatus Configuration

A configuration of an image capturing apparatus 100 according to an embodiment of the present invention will be described with reference to FIG. 1.

Figure 1:
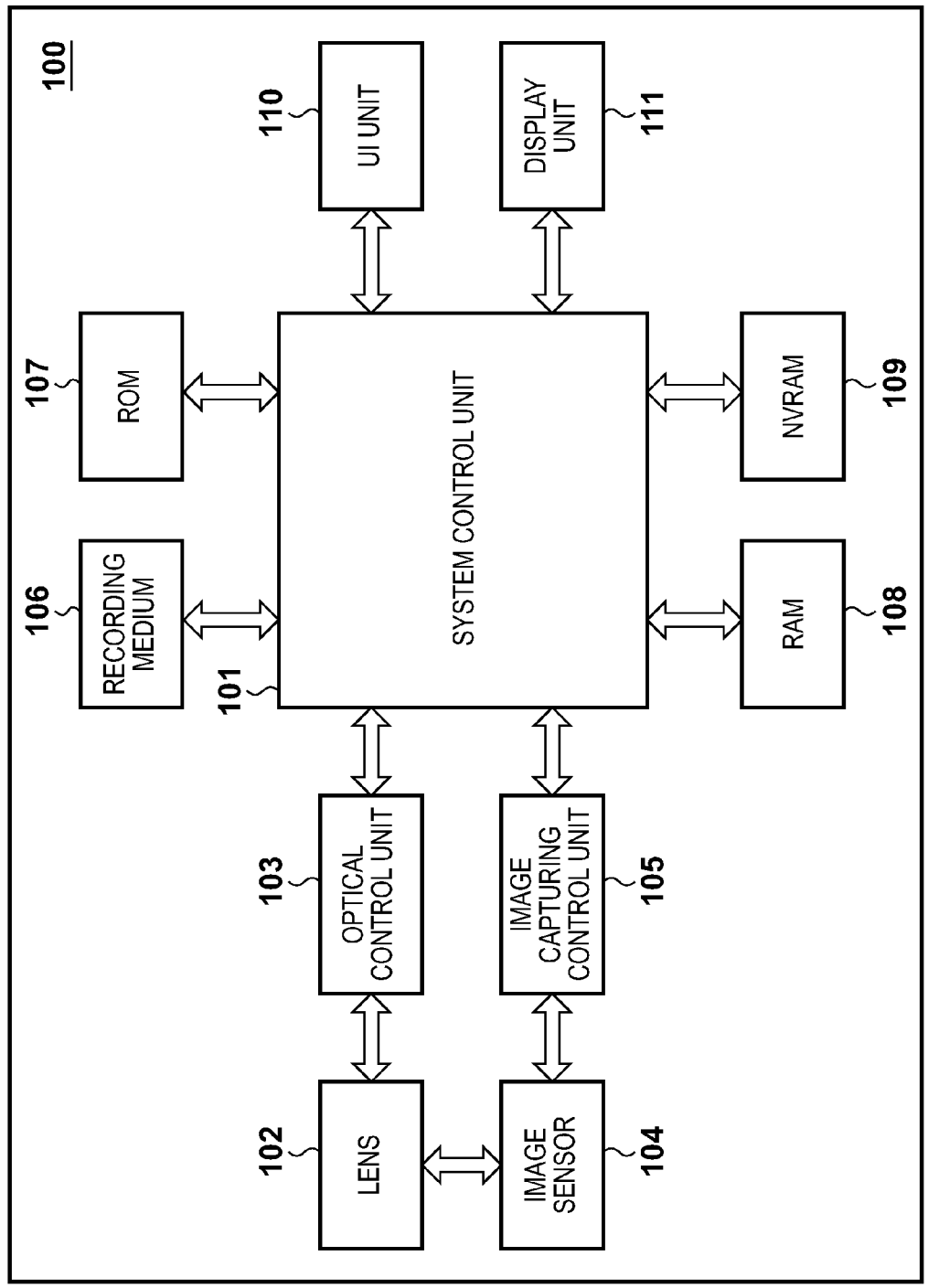
FIG. 1 is a block diagram of an image processing apparatus according to an embodiment of the present invention.

In FIG. 1, reference numeral 101 denotes a system control unit that performs overall control of the image capturing apparatus. The system control unit 101 controls various blocks, which will be described later, so as to process an image in accordance with user settings and operations.

Reference numeral 102 denotes an optical lens unit having aperture, zoom, and focus functions.

Reference numeral 103 denotes an optical control unit that controls the optical lens unit 102 in accordance with an instruction from the system control unit 101. Specifically, the optical control unit 103 is capable of changing the aperture, zoom, and focus of the optical lens unit 102.

Reference numeral 104 denotes an image sensor that photoelectrically converts an image of an object that is input via the optical lens unit 102, and a CCD or a CMOS device is applied as the image sensor 104.

Reference numeral 105 denotes an image capturing control unit that controls the image sensor 104 in accordance with an instruction from the system control unit 101. Specifically, the image capturing control unit 105 adjusts the sensitivity of the image sensor (gain control), reads data from the image sensor in accordance with the shutter speed, and so on (image capturing unit).

The image capturing apparatus 100 controls exposures by causing the optical control unit 103 and the image capturing control unit 105 to change the aperture and the shutter speed, respectively (exposure calculation processing).

Figure 2:
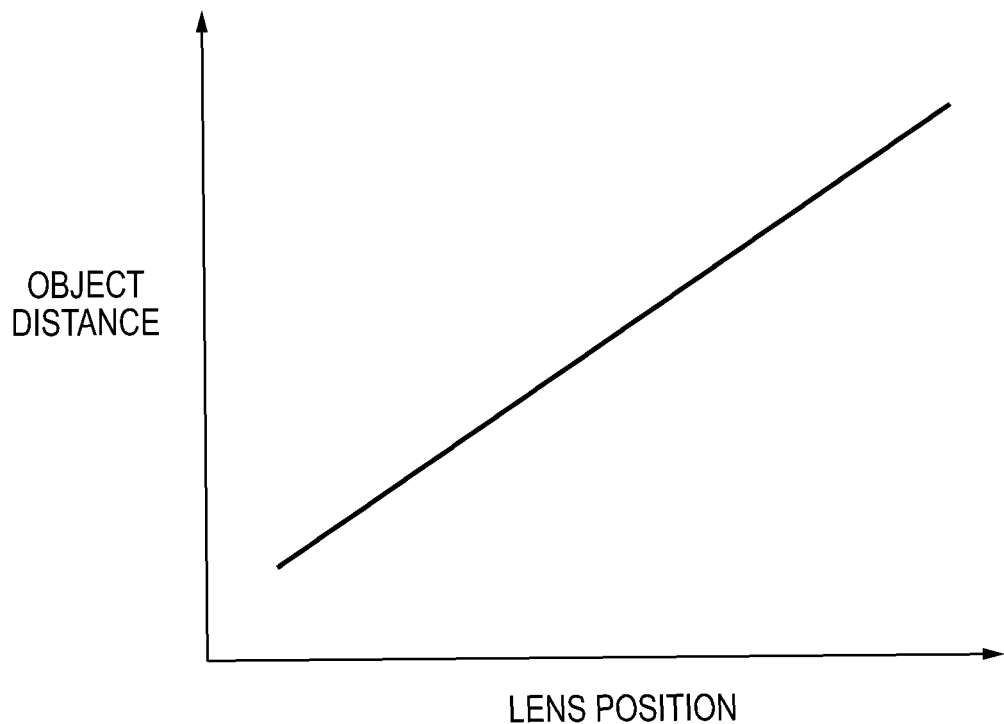
FIG. 2 shows the relationship between a lens position and an object distance.

Here, the optical control unit 103 realizes an autofocus function by driving a focus motor such that a contrast voltage output from the image sensor 104 becomes the maximum. To be more specific, this autofocus function utilizes a characteristic that if the focus position is moved by moving the optical lens unit 102, the contrast of an image to be captured will be changed and become the maximum at the in-focus position. Also, the optical control unit 103 stores, for example, mathematical data indicating the relationship between the position of the optical lens unit 102 and the distance thereof to an object as shown in FIG. 2, as a position/distance table. Accordingly, a distance that corresponds to the position of the optical lens unit 102 when the contrast voltage output from the image sensor 104 becomes the maximum can be output to the system control unit 101 (distance obtaining processing).

A recording medium 106 stores data in accordance with an instruction from the system control unit 101. Specifically, a card-type detachable memory such as an SD memory card, a CompactFlash card (registered trademark), or a memory stick is used as the recording medium 106. Image data output from the image capturing control unit 105 (RAW data) or image data generated from the above image data by the system control unit 101 (JPEG data) is stored in the recording medium 106.

Reference numeral 107 denotes a nonvolatile memory (ROM) for storing a program that controls the image capturing apparatus of the present embodiment and data used by the program. When the image capturing apparatus is turned on, the system control unit 101 reads the program from the ROM 107 and starts control of the image capturing apparatus.

Reference numeral 108 denotes a rewritable volatile memory (RAM) to be used as a work area by the program for controlling the image capturing apparatus. The RAM 108 is also used as a buffer that temporarily stores image data output from the image capturing control unit 105.

Reference numeral 109 denotes a rewritable nonvolatile memory (NVRAM) for storing setting values designated by the user using a UI unit 110, which will be described later, and parameters that are necessary to be retained beyond the power cycle by the image capturing apparatus of the present embodiment.

Reference numeral 110 denotes a UI unit that receives input of user operations and instructions and transmits them to the image capturing apparatus. The UI unit 110 includes a plurality of buttons including an image capturing button and a menu button, a dial, and a touch panel, for example.

Reference numeral 111 denotes a display unit for displaying an image in accordance with an instruction from the system control unit 101. The display unit 111 is constituted by a slim display such as a liquid crystal display (LCD) and a display driver that controls the display.

The display unit 111 displays any of a menu for making various settings of the image capturing apparatus, data of an image output from the image capturing control unit 105 (which is to be used as a finder for determining the composition), a shot image (which is to be used for confirmation of the shot image), and an image stored in the recording medium 106 (which is to be used as an image viewer). Each of the images can be displayed with an arbitrarily graphic image superimposed thereon.

Description of Operations

Now, image generation processing performed by the image capturing apparatus 100 of the present embodiment will be described with reference to FIGS. 3A and 3B.

Figure 3A:
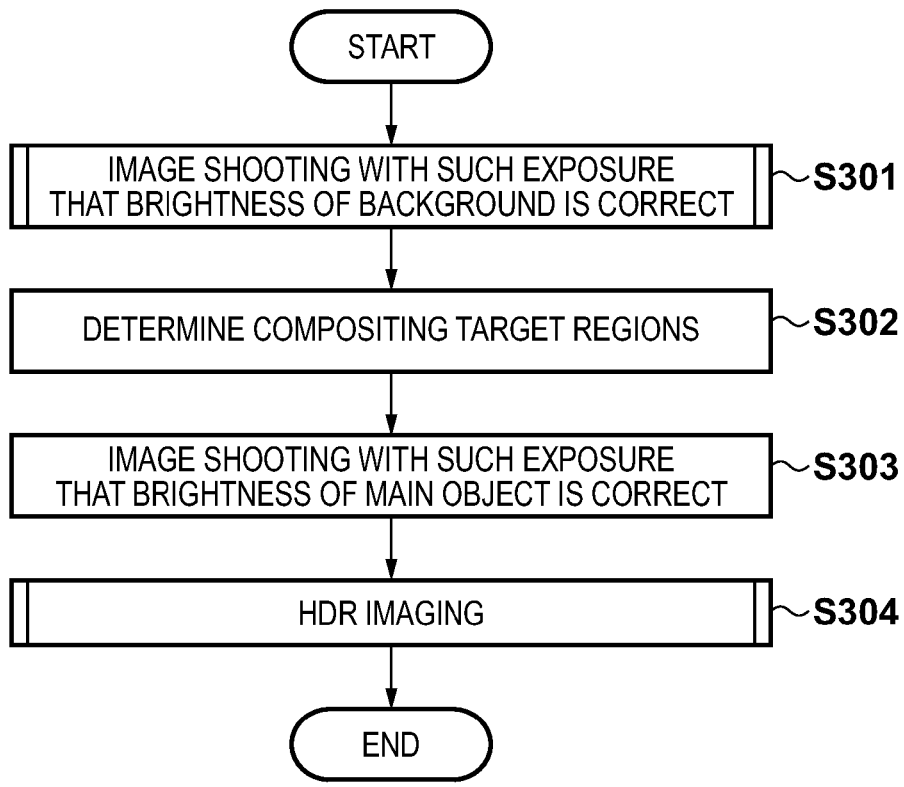
FIG. 3A is a flowchart of image generation processing according to an embodiment of the present invention.

Note that the processing shown in FIG. 3A is realized by the system control unit 101 developing the control program stored in the ROM 107 in the work area of the RAM 108 and executing that program.

The description of the present embodiment is given assuming a scene of shooting a person in an aquarium as the atmosphere of the shooting environment.

Referring to FIG. 3A, in step S301, the system control unit 101 shoots an image by causing the image capturing control unit 105 to adjust an exposure such that a fish tank in the background does not have a highlight-detail loss. Reference numeral 310 in FIG. 3B denotes an image that has been shot so as to achieve correct exposure for the background, and reference numeral 311 denotes the fish tank, reference numeral 312 denotes the floor of the aquarium, and reference numerals 321 to 323 each denote a person.

In step S302, the system control unit 101 determines a region targeted for HDR imaging processing (hereinafter, referred to as a "compositing target region") from the shot image.

In step S303, the system control unit 101 determines a main object from the compositing target region determined in step S302 (main object determination processing) and shoots an image by adjusting an exposure such that the brightness of the main object is correct.

In step S304, the system control unit 101 performs HDR imaging of the two images shot in steps S301 and S303 (image compositing processing).

Now, the processing of step S301 in FIG. 3A will be described in detail with reference to FIGS. 4A and 4B.

Figure 4A:
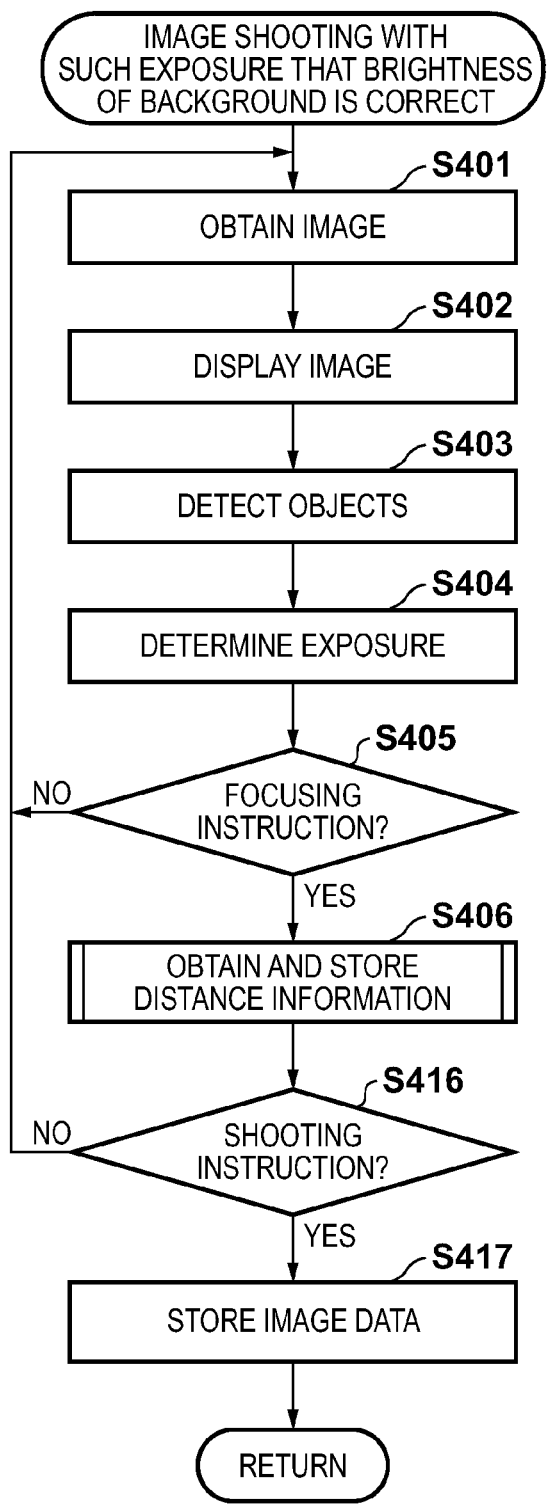
FIG. 4A is a flowchart of image shooting processing according to an embodiment of the present invention.

Referring to FIG. 4A, in step S401, the system control unit 101 causes the image sensor 104 to photoelectrically convert an image that has been input from the optical lens unit 102 and output the converted image to the image capturing control unit 105. The image capturing control unit 105 converts the obtained analog image signal into digital image data and outputs the digital image data to the system control unit 101.

In step S402, the system control unit 101 displays the image data obtained in step S401 on the display unit 111 as an image for determining the composition (for previewing). At this time, the image data output from the image capturing control unit 105 in step S401 is displayed after being adjusted to the resolution of the display unit 111.

In step S403, the system control unit 101 detects target objects from the image data obtained in step S401 and specifies the number of objects and object regions (object detection processing).

The object targeted in the present embodiment is a person's face. A known face detection method is used as the method of detection. Known techniques for face detection include a method using knowledge about the face (e.g., skin color information or facial parts such as eyes, nose, and mouth) and a method of configuring an identifier for face detection in accordance with a learning algorithm typified by the neural net, and face detection is generally performed by combining these methods in order to improve detection accuracy. One specific example is a face detection method using wavelet transform and image feature amounts, described in Japanese Patent Laid-Open No. 2002-251380. Examples of information that is output as a result of the object detection include the positions, sizes, and inclinations of the objects detected, and reliability of the detection result. After the face regions have been specified, person regions other than the faces are extracted and included in the object regions. A known method is used as the above extraction method. For example, a difference in pixel value between a pixel with coordinates in a face region and a pixel adjacent thereto is calculated, and if the value of the difference is less than or equal to a predetermined threshold value, the adjacent pixel is determined as being included in the same person region and is thus included in the object region. The system control unit 101 stores coordinate information for each extracted object region in the RAM 108.

In step S404, the system control unit 101 causes the optical control unit 103 to adjust the shutter speed and the aperture and determine an exposure value so that the brightness of the fish tank 311 is correct.

In step S405, the system control unit 101 checks the presence or absence of a focusing instruction from the UI unit 110. Specifically, a half press of a release button by the user is regarded as a focusing instruction. If a focusing instruction has been received, the processing proceeds to step S406, and if there is no focusing instruction, the processing returns to step S401, in which the image for determining the composition (for previewing) is updated.

Figure 3B:
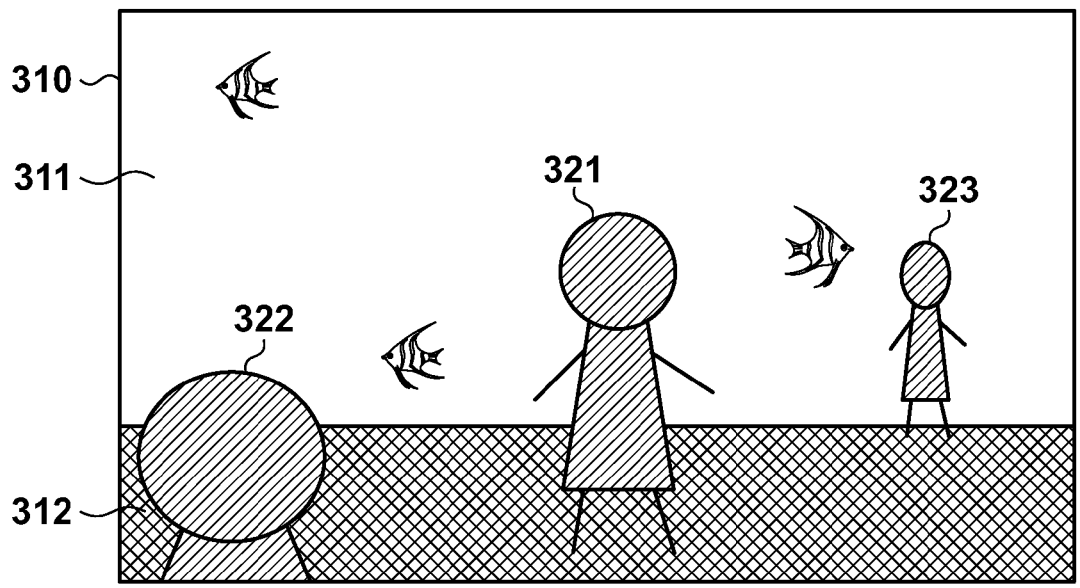
FIG. 3B illustrates an image that is shot so as to achieve correct exposure for the background.

In step S406, the system control unit 101 obtains distance information regarding distance to the main object, during focus control performed on the main object (person 321 in FIG. 3B).

Here, the distance information obtaining processing of step S406 will be described with reference to FIG. 4B.

Figure 4B:
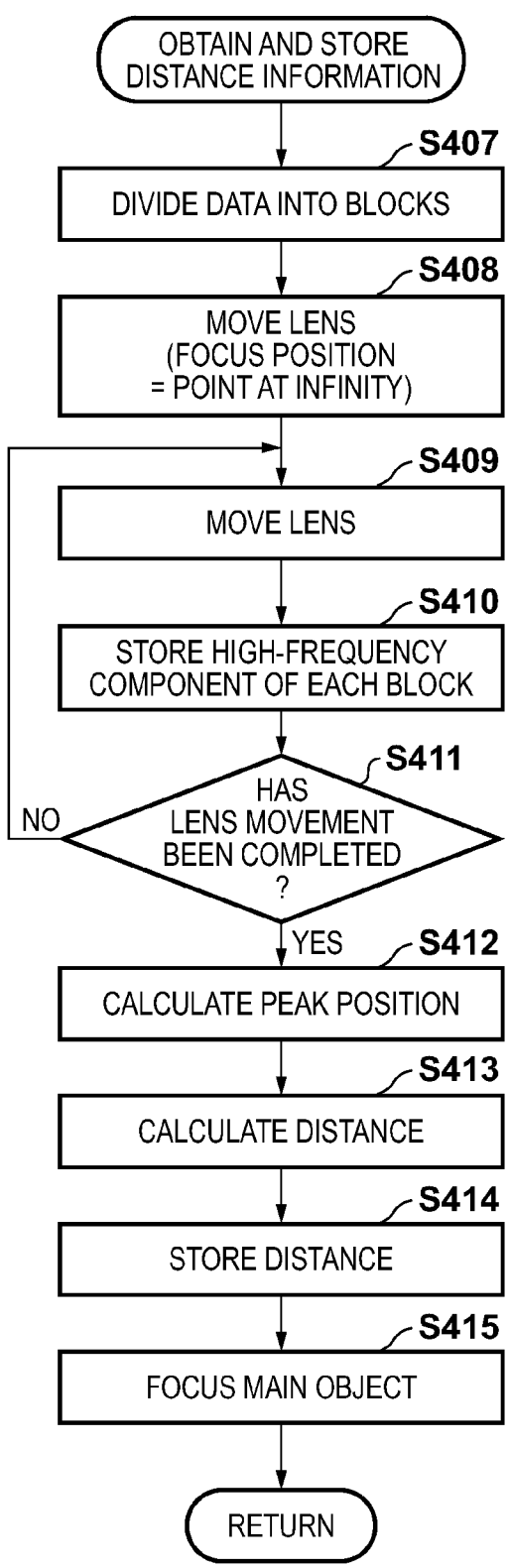
FIG. 4B is a flowchart of distance information obtaining processing according to an embodiment of the present invention.
Figures 5A, 5B:
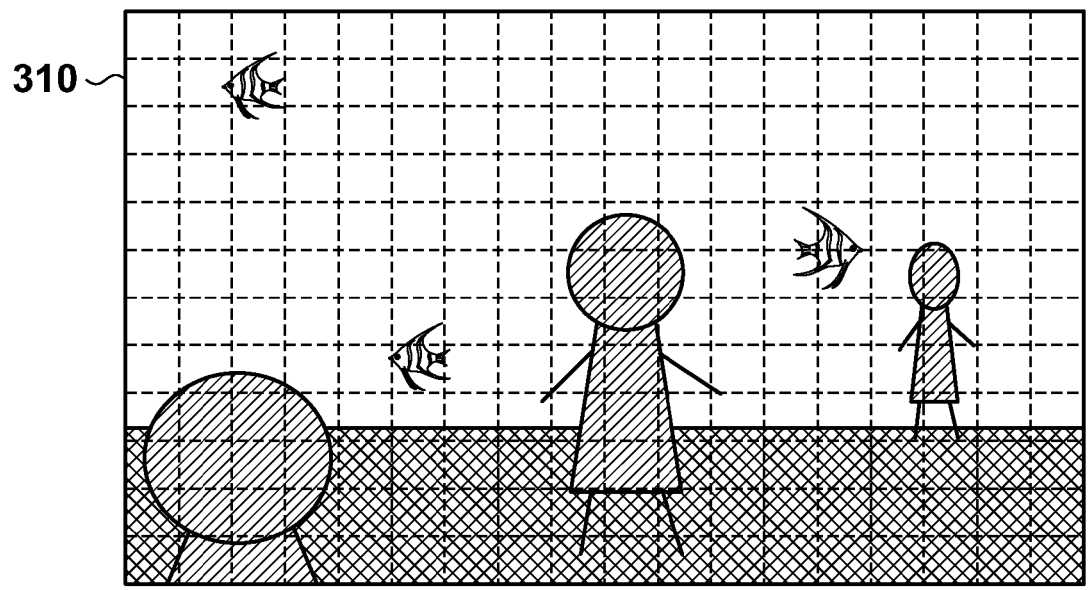
FIG. 5A illustrates a state in which an image is divided into blocks in the distance information obtaining processing of FIG. 4B.
FIG. 5B illustrates a list in which distance information is stored for each block in the distance information obtaining processing of FIG. 4B.

Referring to FIG. 4B, in step S407, the system control unit 101 divides the pixels of the image sensor 104 into M (X coordinate) by N (Y coordinate) blocks, each block including L by L pixels, and in accordance with this division, divides the obtained image data into a plurality of blocks as shown in FIG. 5A.

In step S408, the system control unit 101 causes the optical control unit 103 to move the optical lens unit 102 to a position at which the focal position is the point at infinity.

In step S409, the system control unit 101 causes the optical control unit 103 to move the optical lens unit 102 step by step in a direction in which the focal position becomes closer.

In step S410, the system control unit 101 stores a high-frequency component of each block in the RAM 108.

In step S411, the optical control unit 103 determines whether or not the optical lens unit 102 has been moved to a position at which the focal position is the closest, and notifies the system control unit 101 of the determination result. If the movement of the optical lens unit 102 has been completed, the processing proceeds to step S412, and if the movement has not yet been completed, the processing returns to step S409.

In step S412, the system control unit 101 calculates a lens position at which the high-frequency point of each block reaches its peak.

In step S413, the system control unit 101 calculates the distance to each block based on the relationship between the lens position and the object distance in FIG. 2.

In step S414, the system control unit 101 stores the distance information calculated in step S413 in association with the coordinate information of each block as shown in FIG. 5B in the RAM 108. This distance information may be stored in the header part of the image data or may be stored as a separate file in association with the image data in the recording medium 106. While the distance information is calculated in block units in the present example, it may be calculated in pixel units, assuming that L=1.

In step S415, the optical control unit 103 moves the optical lens unit 102 to a position at which the main object is in focus.

Referring back to FIG. 4A, in step S416, the system control unit 101 checks the presence or absence of a shooting instruction from the UI unit 110. Specifically, a press of the release button by the user or the completion of a self-timer is regarded as a shooting instruction. If a shooting instruction has been received, the processing proceeds to step S417, and if there is no shooting instruction, the processing returns to step S401, in which the image for determining the composition (for previewing) is updated.

In step S417, the system control unit 101 obtains image data at the time of receiving a shooting instruction via the image capturing control unit 105 and stores the obtained image data in the RAM 108.

Next, the processing of step S302 in FIG. 3A will be described with reference to FIG. 6.

Figure 6:
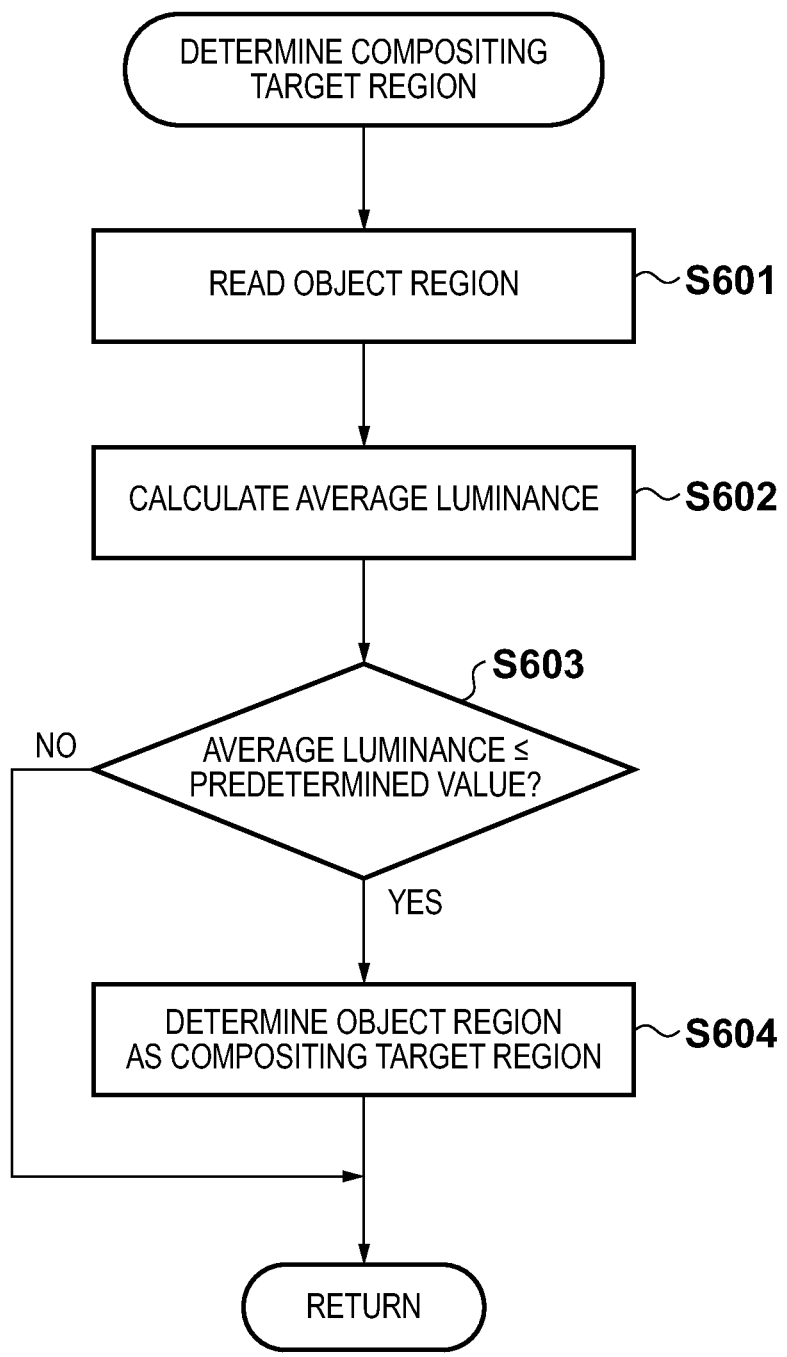
FIG. 6 is a flowchart of compositing target region determination processing according to an embodiment of the present invention.

Referring to FIG. 6, in step S601, the system control unit 101 reads the object regions specified in step S403 from the RAM 108.

In step S602, the system control unit 101 calculates an average luminance value of pixels for each of the object regions read in step S601.

In step S603, the system control unit 101 determines whether or not each of the average luminance values calculated in step S602 is less than or equal to a predetermined threshold value. If the average luminance value is less than or equal to the threshold value, the processing proceeds to step S604, and if the average luminance value is greater than the threshold value, the processing ends.

In step S604, the system control unit 101 determines an object region whose average luminance value is less than or equal to the threshold value, as a compositing target region. Apart from the above-described method of determination, an object region may be determined as a compositing target region when, in the histogram of the object region, the number of pixels that each have a luminance less than or equal to predetermined luminance is greater than or equal to a predetermined value or when the peak luminance is less than or equal to a threshold value. In the present example, the person regions 321 to 323 are determined as compositing target regions.

Referring back to FIG. 3A, in step S303, the system control unit 101 adjusts an exposure such that the brightness of the main object (person 321) is correct, causes the image capturing control unit 105 to shoot an image of the main object (step S303), and stores data of the shot image in the RAM 108. The image shot herein is illustrated as 700 in FIG. 7. The shot image 700 differs from the image 310 in FIG. 3B in that while person regions 711 to 713 and a floor 702 have no shadow-detail loss, a fish tank 701 in the background has a highlight-detail loss.

In step S304, the system control unit 101 performs HDR imaging of the shot image 700 and the image 310 shot in step S301.

Next, the HDR imaging processing of step S304 in FIG. 3A will be described with reference to FIG. 8A.

Figure 8A:
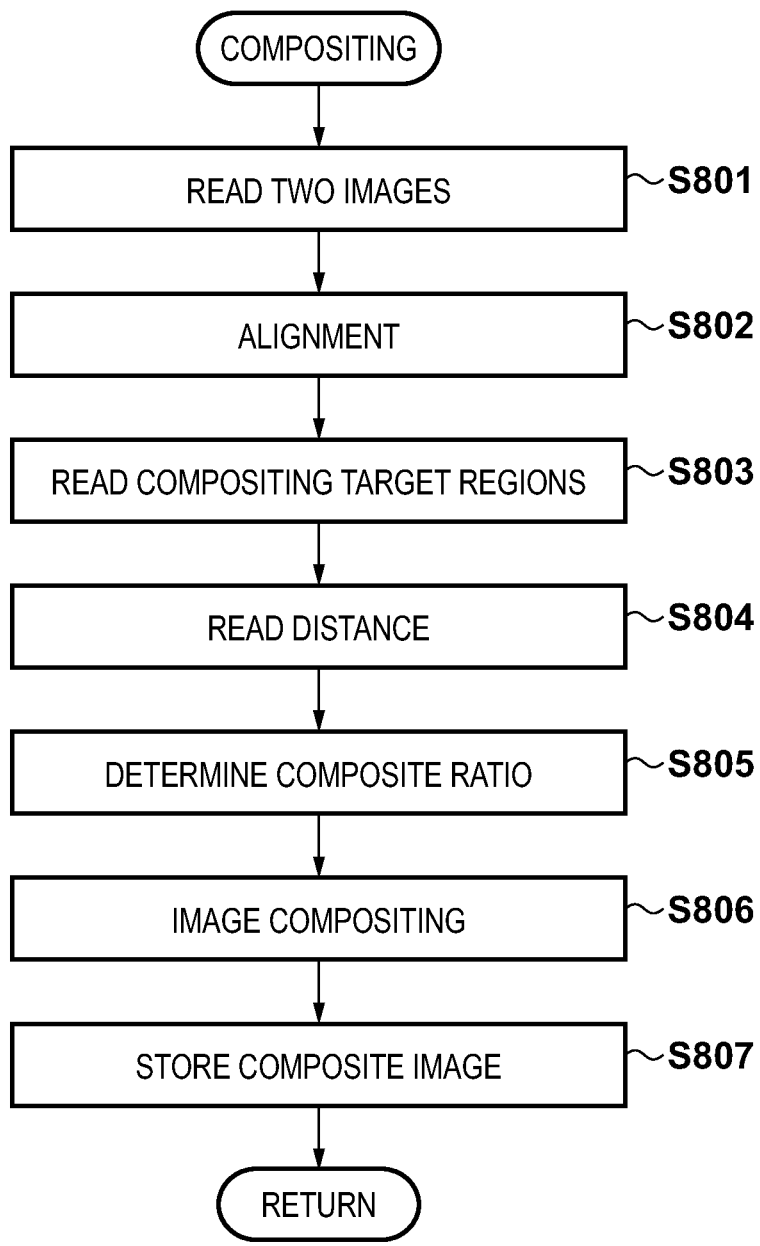
FIG. 8A is a flowchart of HDR imaging processing according to an embodiment of the present embodiment.

Referring to FIG. 8A, in step S801, the system control unit 101 reads data of the image 310 and the image 700 from the RAM 108.

In step S802, the system control unit 101 aligns the two images read in step S801. This alignment is implemented using a known method. For example, feature points are extracted from a plurality of images using the Harris Operator or the like that is a general feature point extraction method as described in Japanese Patent Laid-Open No. 2008-046750, and the feature points of the images are associated with one another. Thereafter, a projective transformation matrix is estimated from the association of the feature points and the images are transformed so as to align the images. Note that the way of aligning a plurality of images is not limited to the above-described method, and other known methods may be used instead. In the present example, alignment is performed by transforming the image 700 relative to the image 310. An image obtained by transforming the image 700 for alignment is hereinafter referred to as an "image 710".

In step S803, the system control unit 101 reads the compositing target regions determined in step S302 from the RAM 108.

In step S804, the system control unit 101 reads the distance information regarding distances from the shooting position to the compositing target regions from the RAM 108. Here, the distance from the shooting position to each compositing target region refers to the distance to the center coordinates of the face region of the object in the compositing target region.

In step S805, the system control unit 101 determines a composite ratio R of the image 710 for a distance Z from the main object, with the position of the main object as a reference. This composite ratio R is set such that it equals 1 at the position of the main object (distance Z=0) and decreases monotonously with increasing distance from the position of the main object. Here, there is the possibility that an object that is present at the back of the main object will be handled as part of the background of the main object. For example, in the case of shooting a scene in which there is a crowd of persons in front of the fish tank, it is highly possible that while some of the persons are part of the background, an object that is present in front of the main object is an irrelevant object such as a coincidentally captured passerby. For this reason, the composite ratio R is set such that an object present in the background of the main object becomes brighter than an object present in front of the main object.

Figure 8B:
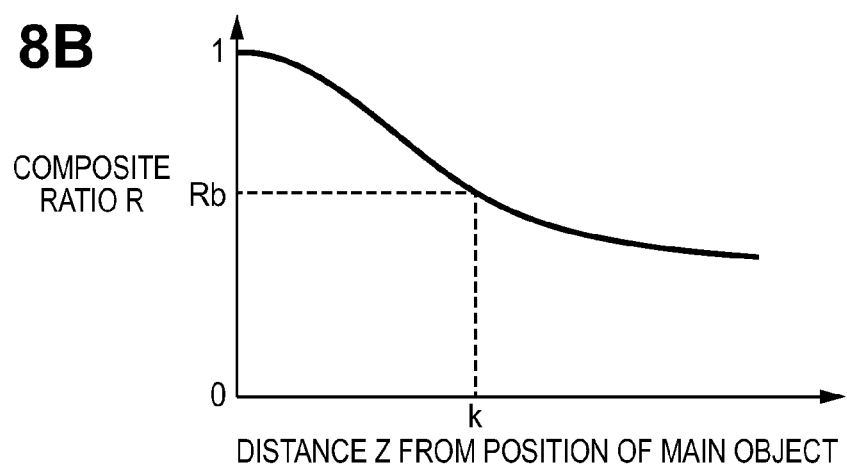
FIG. 8B shows the composite ratio for an object that is present in the background of a main object.
Figure 8C:
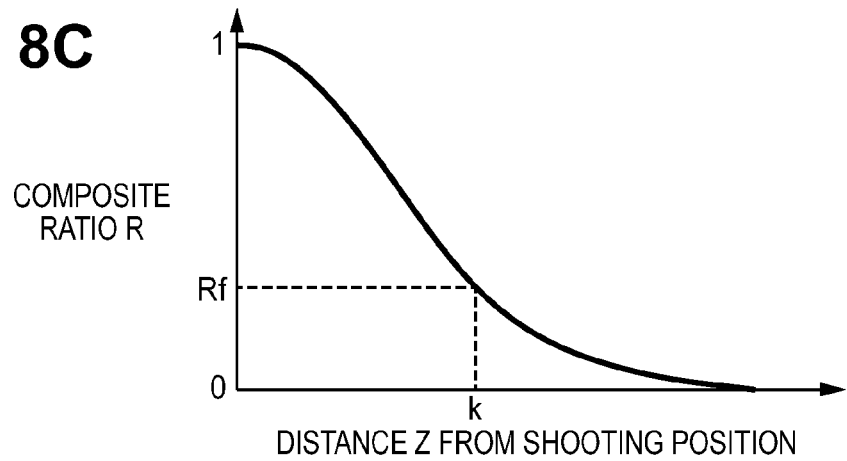
FIG. 8C shows the composite ratio for an object that is present in front of a main object.

Specifically, the ratio of monotonous decrease in the composite ratio R is changed depending on whether the object in a compositing target region is present in front of the main object or at the back of the main object. FIG. 8B is a graph showing the composite ratio R for the region at the back of the main object (background), and FIG. 8C is a graph showing the composite ratio R for the region in front of the main object (foreground). As shown in FIGS. 8B and 8C, the composite ratio R is set such that in the case where Z=k, the composite ratio (Rb) for the region at the back of the main object is higher than the composite ratio (Rf) for the region in front of the main object.

In step S806, the system control unit 101 performs HDR imaging of the image 310 and the image 710 using the composite ratio R determined in step S805. Specifically, pixel values as a result of the HDR imaging are calculated from the following equation.

$$p_2 = R \cdot p_1 + (1-R) \cdot p_0$$

where $p_0$ is the pixel value of a pixel $(X_0, Y_0)$ in a compositing target region of the image 310, which has been shot by adjusting the exposure such that the fish tank in the background does not have a highlight-detail loss, $p_1$ is the pixel value of a pixel corresponding to the pixel $(X_0, Y_0)$ in the image 710, which has been shot by adjusting the exposure such that the brightness of the main object is correct, and $p_2$ is a pixel value obtained as a result of the HDR imaging. After $p_2$ has been calculated, the pixel value of the pixel $(X_0, Y_0)$ in the image 310 is replaced by $p_2$. This is performed on all pixels in the compositing target region.

In step S807, the system control unit 101 stores a composite image 810 obtained in step S806 in the recording medium 106, and the processing ends.

Figure 8D:
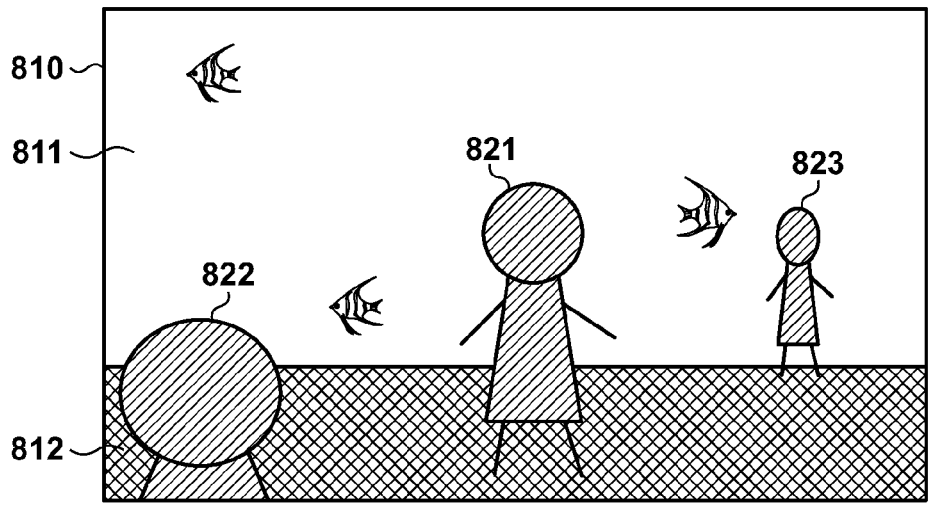
FIG. 8D illustrates the HDR imaging result.

The HDR imaging according to the present embodiment results in an image as shown in FIG. 8D in which while a fish tank 811 has no highlight-detail loss and object regions 821 to 823 have no shadow-detail loss, dark areas other than the objects such as a floor 812 remains dark, and that thus maintains the atmosphere of the aquarium.

Note that in the present embodiment, the exposure values of the two images are set to the exposure value at which the brightness of the main object 321 is correct and a lower exposure value (exposure value at which the brightness of the fish tank 311 is correct). As opposed to this, if there is the need to brighten an object that is present in the background of the main object, shooting may be performed with an exposure value that is set to be higher than the above correct exposure value for the main object.

The method for calculating the distance from the shooting position to an object may be as follows. Specifically, the distance from the image capturing apparatus to a person in association with the size of the face region of that person in an image is compiled into a database in advance. This makes it possible to estimate the distance from the shooting position to an object by, when the face region of a person has been detected, obtaining the size of the face region of the person and making a query to the above database.

While the description of the present embodiment takes the example of the case where the background has a highlight-detail loss when the main object is shot with correct exposure, the present invention is also applicable to the case where the background has a shadow-detail loss. Specifically, HDR compositing of person regions in an image that is shot so as to achieve correct exposure for the background and in an image that is shot with a higher exposure value is performed using the aforementioned method. Furthermore, while the present embodiment takes the example of the case of using a person as an object, the present invention is also applicable to the case where an object is other than a person with use of a known object detection method.

While the present embodiment describes the example in which the composite ratio is gradually changed in accordance with the object distance from the main object (depth distance), the present invention is not limited to this, and a configuration is also possible in which either an image of the object region from the main object or an image of the background region is selectively output.

According to the above-described embodiment, it is possible to execute HDR imaging while changing the composite ratio of images shot with different exposures in accordance with the distance from a main object, as well as maintaining the atmosphere of a shooting environment.

Other Embodiments

Aspects of the present invention can also be realized by a computer of a system or apparatus (or devices such as a CPU or MPU) that reads out and executes a program recorded on a memory device to perform the functions of the above-described embodiment, and by a method, the steps of which are performed by a computer of a system or apparatus by, for example, reading out and executing a program recorded on a memory device to perform the functions of the above-described embodiment. For this purpose, the program is provided to the computer for example via a network or from a recording medium of various types serving as the memory device (e.g., computer-readable medium). In such a case, the system or apparatus, and the recording medium where the program is stored, are included as being within the scope of the present invention.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-284457, filed Dec. 26, 2011, which is hereby incorporated by reference herein in its entirety.

What is claimed is:

1. An image processing apparatus for compositing a plurality of images that are shot with different exposures, comprising:
a processor configured to implement the functions of an object detection unit, a main object determination unit, a distance calculation unit, and a compositing unit, wherein:
the object detection unit is configured to detect object regions from the images;
the main object determination unit is configured to determine a main object region from among the object regions;
the distance calculation unit is configured to calculate object distance information regarding distances to the main object region for the object regions; and
the compositing unit is configured to composite the object regions of the plurality of images using a compositing method based on the object distance information, so as to generate a high dynamic range image.

2. The apparatus according to claim 1, wherein
the plurality of images include a first image that is shot with such an exposure that the brightness of a background region other than the object regions is correct, and a second image that is shot with such an exposure that the brightness of the object regions is correct, and
when compositing the images of the object regions, the compositing unit reduces a composite ratio of the second image with increasing object distance from the main object region.

3. The apparatus according to claim 1, wherein
the plurality of images include a first image that is shot with such an exposure that the brightness of a background region other than the object regions is correct, and a second image that is shot with such an exposure that the brightness of the object regions is correct, and
the compositing unit reduces a composite ratio of the second image for the image of an object region whose object distance from a shooting position is shorter than the object distance of the main object region, more than for the image of an object region whose object distance from the shooting position is longer than the object distance of the main object region.

4. The apparatus according to claim 1, wherein
the plurality of images include a first image that is shot with such an exposure that the brightness of a background region other than the object regions is correct, and a second image that is shot with such an exposure that the brightness of the object regions is correct, and
when compositing the images of the object regions, the compositing unit outputs the second image for an object region whose object distance from the main object region is a first distance and outputs the first image for an object region whose object distance from the main object region is a second distance that is longer than the first distance, so as to generate the high dynamic range image.

5. The apparatus according to claim 1, wherein
the plurality of images include a first image that is shot with such an exposure that the brightness of a background region other than the object regions is correct, and a second image that is shot with such an exposure that the brightness of the object regions is correct, and when compositing the images of the object regions, the compositing unit outputs the first image for an object region whose object distance from a shooting position is shorter than the object distance of the main object region and outputs the second image for an object region whose object distance from the shooting position is longer than the object distance of the main object region, so as to generate the high dynamic range image.

6. The apparatus according to claim 1, wherein the compositing unit uses the compositing method based on the object distance information when the brightness of the object regions is darker than a predetermined brightness and a difference in brightness between the object regions and the background region other than the object regions is greater than or equal to a predetermined value.

7. The apparatus according to claim 1, wherein the object detection unit detects the object regions by detecting faces through face detection processing.

8. The apparatus according to claim 7, wherein the distance calculation unit estimates the distances based on sizes of the faces of the object regions detected by the object detection unit.

9. The apparatus according to claim 1, further comprising:
an image capturing device; and
an exposure calculator configured to calculate an exposure value for an image captured by the image capturing unit.

10. An image processing method for use in an image processing apparatus for compositing a plurality of images that are shot with different exposures, the method comprising:
an object detection step of detecting object regions from the images;
a main object determination step of determining a main object region from among the object regions;
a distance calculation step of calculating object distance information regarding distances to the main object region for the object regions; and
a compositing step of compositing the object regions of the plurality of images using a compositing method based on the object distance information, so as to generate a high dynamic range image.

11. A non-transitory computer-readable storage medium storing a program for causing a computer to execute the method according to claim 10.

* * * * *